May 9, 1933.  L. G. RIGONDEAU  1,908,556
MOTOR DRIVEN WINCH
Filed Jan. 24, 1930  2 Sheets-Sheet 1

Inventor
Louis Gaston Rigondeau

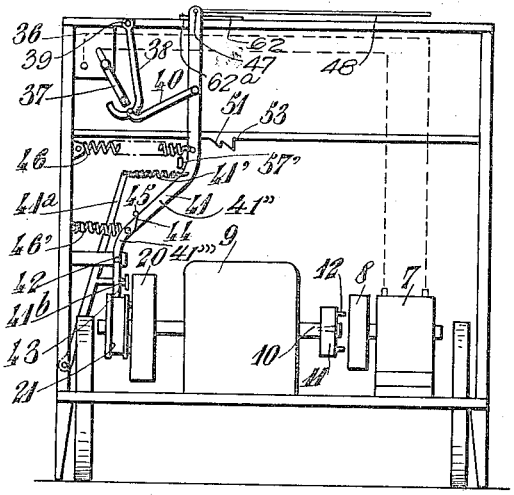

Patented May 9, 1933

1,908,556

UNITED STATES PATENT OFFICE

LOUIS GASTON RIGONDEAU, OF FONTAFIE, NEAR GENOUILLAC, FRANCE

MOTOR DRIVEN WINCH

Application filed January 24, 1930, Serial No. 423,134, and in France January 31, 1929.

The present invention relates to a motor operated winch for use in farming in general and gardening in particular.

The winch is mounted with its operating motor on a frame running on wheels in wheelbarrow fashion, the winch and its motor being located at the bottom of the frame in order that the centre of gravity shall be as low as possible while the cable from the winch passes over guide pulleys, pulley nearest the plough or other tool to be operated, lying in a vertical plane at the bottom of the frame so that the cable can follow any inclination of the ground and may pass under the leaves of plants without harming them.

One object of the invention is to place all the weight of the motor parts in front of the frame over the wheels, whereby the movement thereof is considerably facilitated.

Another object is to mount the supporting wheels within the apparatus so as to reduce considerably the track breadth whereby the apparatus can be moved along very narrow paths.

The apparatus is anchored by means of members it carries without it being necessary to form external anchorages.

Another object is to allow the apparatus to work on all ground, whatever the inclination thereof may be, and to operate over a certain breadth of ground without it being necessary to shift the apparatus in order to maintain the portion of the cable leaving the lower pulley in the plane of the latter.

Another object is to control the winch at a distance by the man guiding the plough or other implement of work.

According to the invention, the traction cable of the implement hauled runs very low, almost flush with the ground, and consequently it passes under the leaves of plants which may be on the ground, and without damaging said plants.

The apparatus may be used either by hauling the working implement in one direction, or by drawing it in both directions, and not only may the clutch of the winch and the motor switch be remotely controlled, but the motor may be reversed from a distance, these three operations being accomplished through the agency of a single control cable carried by the implement.

These and other objects of the invention will become more clearly apparent from the following description taken in conjunction with the accompanying drawings which illustrate an embodiment of the invention diagrammatically and by way of example.

In these drawings:

Fig. 4 is an end view of the traction cable and guiding pulley system, looking in the opposite direction to that of the arrow A, Fig. 1.

Fig. 4A is a plan view of a fragmentary portion of one form of declutching and stopping means.

Fig. 5 is a detail of a locking device for the lever that operates the motor clutch and starting switch.

Fig. 6 is a detail of a device for reversing the driving motor of the winch.

Fig. 7 is a detail of the device for changing the position of the pulleys over which pass the winch cable.

Figure 1:
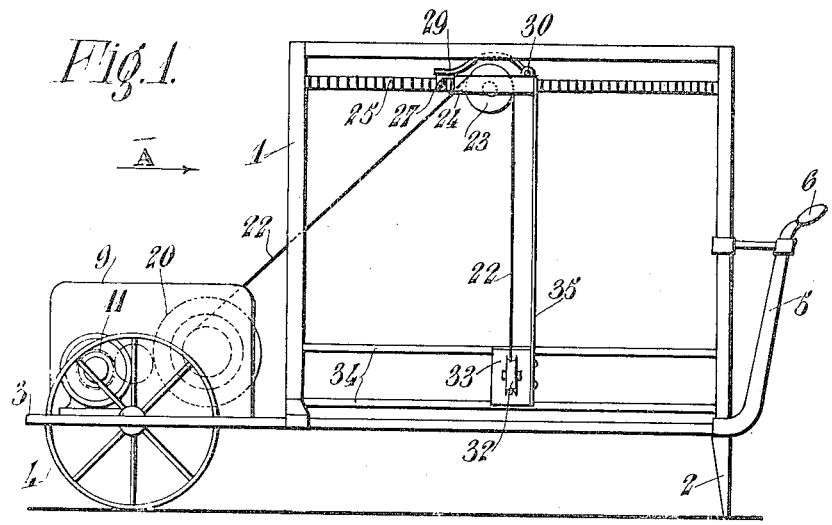
Fig. 1 is a view in side elevation of an apparatus in accordance with the invention.

The several component parts of the apparatus are mounted on a frame 1 formed by a metallic frame work having legs 2 while it is extended in front by a kind of platform 3. Under the platform 3 are mounted two wheels 4, and at its other end the frame 1 is provided with two arms 5 terminated by handgrips 6 whereby on raising the apparatus through the medium of said handgrips 6, said apparatus rests solely on the wheels 4 so that it can be easily trundled in wheelbarrow fashion. The wheels 4 are preferably mounted within the frame of the platform 3 in order to reduce the wheel base and to allow the apparatus to be moved through narrow alleys. On the platform 3 is fixed an electric motor 7 on the shaft of which is mounted a pulley 8.

On the platform 3 is likewise fixed a speed reducer 9, the driving shaft 10 of which is in alignment with the motor shaft 7 while a clutch plate 11 mounted on the shaft 10 and rotating therewith is free to slide on said shaft. It carries two tenons 12 which engage in corresponding recesses of the pulley 8 in order to couple the plate 11 to the pulley 8 so that the speed reducer can be driven by the motor. If these members are disconnected, the motor may be used for other purposes.

The speed reducer may be of any suitable type. The one considered to be the best includes, as illustrated in the drawing, three reduction gears in order to decrease substantially the ratio of the speed of rotation of the motor to the tractive speed of the apparatus to be hauled: plough or the like. The spindles 13, 14 and 15 of said three reduction gears extend beyond the housing of the speed reducer so that they may be utilized to operate other apparatus by selecting the speed which is best suited to each of them. The final reduction gear has preferably two speeds in order that two speeds may be obtained with the hauling winch presently to be described. This is achieved in the known manner through the agency of a shift collar 14$^a$ sliding on the shaft 14 and carrying two pinions of different diameters 16 and 17 gearing with the toothed wheels 18 and 19 respectively, the latter wheels being fixed on the shaft 15. The shift collar 14$^a$ is moved from outside the housing by means of a projecting rod 14′, causing gears 16 and 19 or gears 17 and 18 to rotate together.

On the spindle 15 is loosely mounted the drum 20 of the winch. It may be locked to said spindle by means of a claw clutch constituted by a collar 21 carrying the claws and rotating with the spindle 15 but sliding thereon so that its claws can engage with other claws carried by the drum 20.

The traction cable 22 which winds on the drum 20 passes therefrom over a grooved pulley 23 situated in the median vertical plane of the drum 20. Said grooved pulley 23 can shift longitudinally in this plane due to its being mounted in a saddle 24 which slides along a slide-way 25 located at the upper part of the frame.

Figure 2:
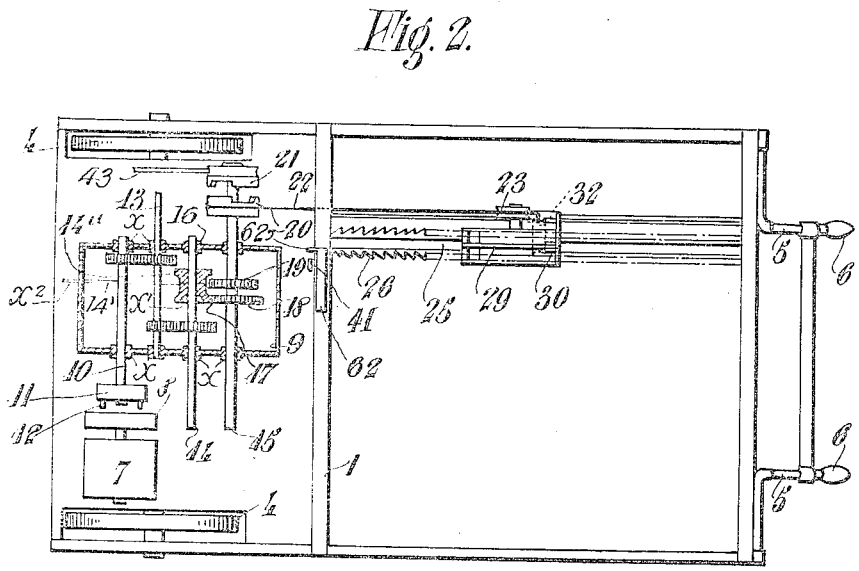
Fig. 2 is a plan view.

This slide-way is provided on either side thereof with saw teeth 26 with which engage pins 27 pivotally mounted as at 28 on the saddle 24. The saddle 24 is likewise provided with a handle 29 pivotally mounted thereon at 30. By pulling the saddle to the right (Fig. 2) the pins move apart at each tooth and drop back beyond the same under the action of their weight aided if necessary by springs 31. The saddle is thus prevented from any displacement to the left which might take place under the action of the tractive pull exerted on the cable by the drum 20. The saddle is shifted by hand in this direction by pressing on the handle 29, the end of which bears against the tails of the pins 27 and causes the latter to rock. The pins 27 being thus raised allow the saddle 24 to slide freely to the left along the slide-way 25.

From the pulley 23, the cable 22 passes over a second grooved pulley 32 located in a vertical plane perpendicular to that of the pulley 23, and thus leaves perpendicularly to the apparatus and may assume any desired inclination in the vertical plane of the pulley 32, thus allowing the plough or other appliance to be drawn in an inclined plane, whatever the degree of inclination may be.

The pulley 32 is supported by a bracket 33 sliding in a slide-way 34. The bracket 33 is secured to the saddle 24 by one or several bars 35 so that the cable 22 shall always pass vertically from the pulley 24 to the pulley 32. It will be seen that by shifting the pulleys 23 and 32 along the frame, the point of application of the pull may be changed so that for example several parallel furrows may be dug with the plough without it being necessary to shift the whole apparatus.

Figure 3:
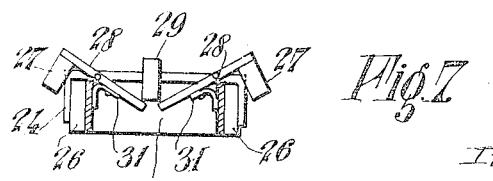
Fig. 3 is an end view of the winch driving mechanism looking in the direction of the arrow A, Fig. 1.

The following members are provided for controlling from a distance the starting and stopping of the winch. At the upper part of the frame (Fig. 3) is located the switch 36 for supplying current to the motor 7. Said switch is operated by means of the handle 37, the end of which is held in a hook 38 pivotally mounted at 39 on the frame 1. Said hook 38 is connected by a rod 40 to a bell-crank lever 41 pivotally mounted at 42 on the frame 1. The small arm 43 of the lever 41 projects into the groove of the collar 21. The lever 41 is cut on the bias at 44, the two sections 41″ and 41‴ thus formed being hingedly connected together at 45. Two return springs 46 and 46′ fixed at one end to the frame 1 and at the other end to the sections 41″ and 41‴ respectively draw the two sections to the left (Fig. 3).

At the upper end of the lever 41, at 47, is fastened the control cable 48 which may be carried by the plough or the like. If it be assumed that in Fig. 3 the members are in the operative position, that is to say, that the current is turned on and that the collar 21 engages with the drum 20, if the cable 48 be pulled, the lever 41 will be rotated about pivot 42 and the arm 43 will shift the collar 21 to the left whereby declutching ensues. At the same time the lever 41 pulls on the rod 40 which lifts the hook 38 which rotates the handle of the switch thereby cutting off the current. Finally, through the medium of a spring 41″ the lever 41′ pulls another lever 41$^a$ which carries a brake shoe 41$^b$ which is brought to bear against the cheek of the drum 20 so as to immediately arrest the latter's rotation which would otherwise continue due to the inertia of the various rotating members after the circuit has been broken.

In order to lock the lever 41 in the stopping position despite the action of the return springs 46 and 46', there is mounted on the lever a catch 49 which is pushed upwardly by a spring 50 and which, when the lever 41 is pulled by the cable 48, bears against a ratchet 51 carried by the frame 1. The catch 49 descends forcing back the spring 50, and is then forced by the latter into the notch 52. It then locks the lever 41 to which it is secured and the mechanism remains in the position of rest. To start up again, an additional pull is exerted on the cable 48, the lever 41 moves still further to the left and with it the catch 49 which bears against the ratchet tooth 53 which projects a greater distance than the tooth 51, forcing back still further the spring 50. There comes a time when the finger 54 pivoting at 54' and pulled by a spring 55, drops on to the shoulder 56 carried by the catch 49 thus locking the latter. On releasing the cable 48, the lever 41 is drawn back by the spring 46, the catch held in the lower position by the finger 54 passes beyond the notch 52 and the lever 41 can return to the starting position. At this moment, the extension 57 of the finger 54 bears against a stop 57' carried by the frame 1, the finger escapes from the shoulder 56, and the catch 49 is thrust back by the spring 50 and returns to the starting position, ready to operate anew.

In its return movement the lever 41 pushes back the rod 40 and with it the hook 38 which pushes the handle of the switch into the starting position whereby the motor is started up again. At the same time, the lever 41 tends to re-engage the clutch 20—21. However, it may happen, as is most often the case, that the claws of one of the parts are not exactly in register with the corresponding notches. The lever 41, were it rigid, could not return completely and, in particular, could not return the handle 37 of the switch to start up the motor.

The fracture 44 renders this possible, however. The upper portion 41″ of the lever comes completely back to actuate the switch while the lower portion 41‴ does not return completely. When the motor and, with it, the collar 21 start rotating, the action of the spring 46' causes the clutch to be let in as soon as the claws of one of the members are in register with the recesses of the other. It will be seen that in this manner the apparatus is started up and stopped from a distance by the person guiding the plough or other appliance, without it being necessary to have anybody near the winch so that the latter may be operated at minimum cost.

In order to avoid the apparatus being damaged when the plough comes up against it, should the person guiding the latter fail to perform the necessary operations sufficiently early, an automatic stopping device is provided. The latter is constituted by a fork 58 straddling the cable 22 forward of the pulley 32. Said fork slides on a square shaft 59 running parallel to the slide-way 34. The fork 58 is shifted by the bracket 33 so as to be always forward of the pulley 32. The square shaft 59 pivots on the frame in bearings 59a and carries an arm 60 at the end near the lever 41. When the plough comes up against the fork 58, it pushes back the latter whereby the shaft 59 and with it the arm 60 are swung in the counter-clockwise direction (Fig. 4). The arm 60 causes the member 62 to slide on the frame through the medium of the rod 61, said member 62 carrying a projection 62a which hooks on to the lever 41 and draws it towards the right (Fig. 3) in order to produce the same movements as when the cable 48 was pulled, that is to say, declutching of the winch and stoppage of the motor.

It should be observed in this connection that the plough can enter right inside the apparatus, the frame being without a transverse brace member at one side. It is thus possible to work right up to the apparatus.

In order to anchor the apparatus in the ground and to avoid shifting the latter when the plough encounters too high a resistance, one or more anchoring members 63 are pivotally mounted on the frame at 64. Said anchoring member is suspended from a cable 65 winding on a pulley 66 which can be rotated by a crank 67 to raise or lower the anchoring member. Preferably one anchoring member will be provided at each end of the apparatus, the two corresponding pulleys 66 being mounted on a common axle rotated by a single crank-handle 67. By slackening the cable 65 the anchoring member 63 is lowered to the ground and under the action of the traction of the cable, anchors therein, thus preventing all subsequent movement of the apparatus in the direction of pull of the cable.

In order to keep the cable perfectly taut, so that it will be continuously rotated by the pulley mounted on the winch, a cable stretching device (not shown) is provided at some point or other for example on the plough. With this device, a reversible motor is preferably utilized, so as to be able to reverse directly the direction of rotation of the motor and consequently of the whole assembly of rotating parts driven by it. When the implement has reached the end of the field furthest from the apparatus, the following device is used:

By the side of the lever 41 is mounted another lever 69 likewise pivoted to the frame of the machine.

Said lever 69 is connected to the lever 41 by means of a powerful spring 70, while the control cable 48 is fastened to the lever 69. When the cable 48 is pulled in the direction of the arrow (Fig. 6), the lever 69 moves the lever 41 which operates in the same manner as that previously indicated. To the lever 69 is also fastened a cable 71 which after passing over a guide pulley 72 passes through an eye 73 fixed at the end of the reversing lever of the motor. Finally, and beyond said eye, a weight 74, large enough not to pass through the eye 73, is suspended from the cable. When the cable 48 has been pulled and the lever 41 has been completely shifted to the right, in the manner described, said lever 41 can no longer shift and the sole purpose of pulling further on the lever 69 is to tension the spring 70. But during this movement, the pull exerted on the cable 71 causes the weight 74, whose position on the cable 71 has been adjusted with this object, to raise the eye 73 carried by the motor reversing lever, and consequently reverses the motor. On allowing the cable 48 to slip back, the lever 69 first returns towards the lever 41 under the action of the spring 70, then said lever 41 is itself shifted to the left, in the manner described above, to start the motor again, which then rotates in the other direction.

When it has thus been started in this manner at the other end of the field, the motor hauls the implement towards the winch and when it has returned near the winch, the person guiding it can then reverse the direction of rotation of the reversible motor by lowering the eye 73, which is possible, since at this moment the weight 74 is in such a position as not to hinder the movement of said eye.

I claim:

1. A motor driven winch comprising, in combination, a frame, a motor, a winch, means for driving said winch from said motor, said motor and winch being mounted at the lower part of said frame, a cable adapted to connect said winch to the apparatus to be driven, and two pulleys over which said cable passes, the pulley from which said cable leaves said frame being located in a vertical plane at the lower part of said frame whereby said cable can follow the inclination of the ground, while the other pulley is located at the upper part of the frame in a vertical plane perpendicular to the plane of said lower pulley.

2. A motor driven winch comprising, in combination, a frame, an electric motor, a winch, means for driving said winch from said motor, said motor and winch being mounted at the lower part of said frame, a cable adapted to connect said winch to the apparatus to be driven, pulleys over which said cable passes, the pulley from which said cable leaves said winch being located in a vertical plane at the lower part of said frame whereby said cable can follow the inclination of the ground, a clutch between said motor and said winch, a lever for actuating said clutch, a cable for actuating said lever from a distance, a switch for controlling the current supply to said motor, and means associated with said lever and actuated when said lever is moved, for operating said switch.

3. A motor driven winch according to claim 2, in combination with means for locking said lever in the declutching position in which the switch is open.

4. A motor driven winch according to claim 2, in combination with a notched member carried by the frame, a catch carried by said lever and adapted to engage with said notched member for locking said lever in the declutching and switch opening position, means operative upon predetermined displacement of the lever in the declutching direction and with which said notched member cooperates, for holding the catch in non-locking position, and a stop against which said catch holding means abuts upon the return of the lever to release said catch.

5. A motor driven winch according to claim 2, in which said lever is pivoted at a point intermediate the ends thereof and is formed of two sections pivotally connected to each other at a point on the side of the pivot point remote from the clutch engaging end of said lever, relative movement between the sections of said lever being thereby permitted whereby one portion of said lever can open said switch without the other portion simultaneously disengaging said clutch.

6. A motor driven winch comprising, in combination, a frame, an electric motor, a winch, means for driving said winch from said motor, said motor and winch being mounted at the lower part of said frame, a cable connecting said winch to the apparatus to be driven, two pulleys over which said cable runs, both said pulleys being mounted vertically one at the upper portion of the frame with its axis disposed breadthwise thereof, and the other at the lower portion of said frame with its axis disposed lengthwise thereof, saddle members carrying said pulleys, slide-ways fitted to said frame and along which the respective saddle members slide, means for connecting said saddle members rigidly together whereby the point of aplication of the pull of the cable may be varied without shifting the winch unit, a clutch between said motor and said winch, a lever for controlling said clutch, a cable secured to said lever and adapted to be connected to the apparatus to be driven for actuating said lever from said apparatus to be driven, a switch for controlling the current supply to said motor, and means associated with said motor and actuated when said lever is moved, for operating said switch.

7. A motor driven winch according to claim 6, in combination with saw teeth formed in the slide-way of the upper saddle member, a plurality of catches carried by said upper saddle member and engaging with said teeth to prevent said saddle member from being displaced by pull of the cable thereon, and means for releasing said catches from said teeth to shift said saddle member.

8. A motor driven winch according to claim 2, in combination with means for actuating said lever independently of said cable, and a member connected to said lever actuating means and adapted to be pushed by the apparatus hauled by the winch unit when said apparatus reaches said winch unit.

9. A motor driven winch according to claim 6, in combination with a forked member straddling said cable and hingedly connected to the lower of said saddle members to be shifted therewith, a shaft extending across said frame and on which said forked member is slidably mounted, said shaft being adapted to be rocked by said forked member when the latter is swung by being contacted by the apparatus hauled by the winch unit, a clutch between said motor and said winch, a lever for actuating said clutch, a cable for actuating said lever from a distance, a switch for controlling the current supply to said motor, means associated with said lever and actuated when said lever is moved, for operating said switch, and means connecting said shaft to said lever whereby the latter is moved into the declutching and switch opening position when said shaft is rocked by said forked member.

10. A motor driven winch comprising in combination, a frame, a motor, a winch, means for driving said winch from said motor, said motor and winch being mounted at the lower part of said frame, a cable adapted to connect said winch to the apparatus to be driven, two pulleys over which said cable passes, both said pulleys being located in a vertical plane, one at the upper part of the frame and the other perpendicularly thereto and vertically below it at the lower part of said frame whereby said cable can follow the inclination of the ground, a clutch between said motor and said winch, a lever for actuating said clutch, and means, adapted to be secured to said apparatus to be driven, for actuating said lever from a distance.

LOUIS GASTON RIGONDEAU.